(12) United States Patent
Umeya

(10) Patent No.: US 6,816,215 B2
(45) Date of Patent: Nov. 9, 2004

(54) CIRCULAR POLARIZATION CONTROLLING OPTICAL ELEMENT AND METHOD OF PRODUCING THE SAME

(75) Inventor: Masanori Umeya, Shinjuku-Ku (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 10/107,445

(22) Filed: Mar. 28, 2002

(65) Prior Publication Data

US 2002/0167627 A1 Nov. 14, 2002

(30) Foreign Application Priority Data

Mar. 28, 2001 (JP) ........................................ 2001-094057

(51) Int. Cl.$^7$ ........................... G02F 1/1335; G02F 1/13
(52) U.S. Cl. ........................... 349/98; 349/96; 349/187
(58) Field of Search ........................... 349/96, 98, 187; 522/99

(56) References Cited

U.S. PATENT DOCUMENTS

| | | | | |
|---|---|---|---|---|
| 4,410,570 A | | 10/1983 | Kreuzer et al. ........... | 427/374.1 |
| 5,061,046 A | | 10/1991 | Lee et al. ................... | 359/53 |
| 5,691,789 A | * | 11/1997 | Li et al. ..................... | 349/98 |
| 6,013,693 A | * | 1/2000 | Takahashi et al. ......... | 522/99 |
| 6,034,753 A | * | 3/2000 | Li et al. ..................... | 349/98 |
| 6,181,395 B1 | | 1/2001 | Li et al. ..................... | 349/96 |
| 6,421,107 B1 | | 7/2002 | Greenfield et al. ........ | 349/115 |
| 6,433,853 B1 | * | 8/2002 | Kameyama et al. ........ | 349/176 |
| 2001/0052961 A1 | * | 12/2001 | Towler et al. .............. | 349/177 |
| 2002/0159019 A1 | * | 10/2002 | Pokorny et al. ............ | 349/187 |

FOREIGN PATENT DOCUMENTS

| | | | | |
|---|---|---|---|---|
| EP | 0606940 A2 | * | 7/1994 | ............ G02B/5/30 |
| EP | 0 606 940 A2 A3 | | 7/1994 | |
| EP | 0 982 605 A1 | | 3/2000 | |
| GB | 2 166 755 A | * | 5/1986 | ............ C09K/19/02 |
| GB | 2 166755 A | | 5/1986 | ............ C09K/19/02 |
| JP | 57-165480 | | 10/1982 | |
| JP | 06-281814 | | 10/1994 | |
| JP | 07-258638 | | 10/1995 | |
| JP | 10-508882 | | 9/1998 | |
| JP | 10-319235 | | 12/1998 | |
| JP | 11-044816 | | 2/1999 | |

OTHER PUBLICATIONS

Broer et al., "Photo–Induced Diffusion in Polymerizing Chiral–Nematic Media," Advanced Materials, 1999, vol. 11, No. 7, pp 573–578, XP–000849020.

Broer et al., "Wide–Band Reflective Polarizers From Cholesteric Polymer Networks with a Pitch Gradient," Nature, MacMillan Journals Ltd. London, Nov. 30, 1995, vol. 378, No. 6556, pp 467–469, XP–002091585.

* cited by examiner

Primary Examiner—Robert H. Kim
Assistant Examiner—Jeanne Andrea Di Grazio
(74) Attorney, Agent, or Firm—Parkhurst & Wendel, L.L.P.

(57) ABSTRACT

An uncured cholesteric liquid crystal layer 18 having a cholesteric order, including nematic liquid crystal, a chiral agent and a photopolymerization initiator is formed on an alignment film 16 on a glass substrate 12. This uncured cholesteric liquid crystal layer 18 is cured by applying to it ultraviolet light with a low intensity under such conditions that one surface of the uncured cholesteric liquid crystal layer is brought into close contact with the alignment film 16 on the glass substrate 12 so that it will not come into contact with oxygen and that the other surface of the same is exposed to air.

11 Claims, 6 Drawing Sheets

CIRCULAR POLARIZATION CONTROLLING OPTICAL ELEMENT AND METHOD OF PRODUCING THE SAME

FIELD OF THE INVENTION

The present invention relates to a circular polarization controlling optical element for extracting right- or left-handed circularly polarized light from non-polarized light, and to a method of producing the same.

BACKGROUND ART

There has conventionally been known, as a circular polarization controlling optical element having the above-described function, an optical element that includes a liquid crystal layer having a cholesteric order (cholesteric regularity) and that reflects, in a specific reflection wave rage, either right- or left-handed circularly polarized light having a wavelength equivalent to the pitch (helical pitch) in the helical structure of the liquid crystal layer and transmits the other circularly polarized light. The term "liquid crystal layer" herein used means a layer having the properties of liquid crystal in the optical sense, and includes not only a layer of liquid crystal phase having flowability but also a layer of solid phase obtained by solidifying liquid crystal phase while retaining the alignment of molecules characteristic of the liquid crystal phase.

Such circular polarization controlling optical elements are extensively used in liquid crystal display panels or the like, and are often required to have reflection wave ranges as wide as the entire visible light range.

In the circular polarization controlling optical elements, there has conventionally been known, as a technique for broadening the reflection wave range, such a method that a plurality of liquid crystal layers having reflection wave ranges centered at different wavelengths are laminated. Another known method is such that a cholesteric liquid crystalline material whose helical pitch can be varied stepwise (continuously) is used so that the helical pitch is varied in the direction of thickness (U.S. Pat. No. 5,691,789 and Japanese Patent Laid-Open Publication No. 281814/1994). Further, Japanese Patent Laid-Open Publications No. 319235/1998 and No. 44816/1999 disclose such a method that, after two cholesteric liquid crystalline polymer layers are subjected to contact bonding, the helical pitch is varied stepwise through heat treatment.

In the above-described conventional method in which a plurality of liquid crystal layers having reflection wave ranges centered at different wavelengths are laminated, the entire reflection wave range of the laminate is simply the sum of the reflection wave ranges of the respective liquid crystal layers. It is therefore necessary to laminate a great number of liquid crystal layers if it is desired to obtain a laminate having a reflection wave range that covers the entire visible light range. In this case, however, the influence of reflection of light caused at the interface between each two liquid crystal layers laminated is not negligible, and the laminate is to have poor optical properties.

The above-described method using a cholesteric liquid crystalline material whose helical pitch can be varied stepwise (continuously) is advantageous in that the degree of reflectance of circularly polarized light can be made constant to some extent because the broadening of reflection wave range can be attained by the use of a single liquid crystal layer. In this method, however, it is necessary to incorporate non-crosslinkable liquid crystalline molecules (U.S. Pat. No. 5,691,789) or coloring materials (Japanese Patent Laid-Open Publication No.281814/1994) into the liquid crystalline material. The liquid crystalline material containing such molecules or coloring materials is poor in heat resistance. Moreover, the resulting liquid crystal layer is colored, so that it is poor in optical properties.

Further, in the above-described conventional method in which two cholesteric liquid crystalline polymer layers are subjected to contact bonding and then to heat treatment, the liquid crystalline materials are required to have heat resistance because the heat treatment is carried out at high temperatures. Therefore, types of liquid crystalline materials useful in this method are inevitably limited. In addition, the bonded surfaces of the liquid crystalline polymer layers have been polymerized; this means that the optical interface cannot fully disappear. If such interfaces remain to a large extent, the resulting liquid crystal layer shows poor optical properties.

Furthermore, those liquid crystals that are used in the aforementioned conventional methods are not reactive. It is therefore difficult to fix the structure of the liquid crystal layers after their reflection wave ranges are broadened; if the liquid crystal layers are heated again, they undergo structural changes.

SUMMARY OF THE INVENTION

The inventor has made earnest studies in order to overcome the forgoing problems, and, as a result, finally found that it is possible to make the transition from a cholesteric phase in which the helical pitch is intrinsically uniform throughout a liquid crystal layer to such a cholesteric phase in which the helical pitch continuously varies in a liquid crystal layer, by a simple method imparting different degrees of curing to the two surfaces of a liquid crystal layer having a cholesteric order.

The present invention has been accomplished on the basis of the above finding. An object of the present invention is therefore to provide a circular polarization controlling optical element having a broadened reflection wave range without experiencing deterioration of optical properties by interfacial reflection or the like, and to provide a method of producing such an optical element.

Another object of the present invention is to provide a circular polarization controlling optical element showing heat resistance, having optical properties that have been fixed and that will not change even when heated, and to provide a method of producing such an optical element.

A first aspect of the present invention is a circular polarization controlling optical element that includes a cured liquid crystal layer having a cholesteric order in planar alignment, the liquid crystal layer including liquid crystalline molecules and a chiral agent for controlling the helical pitch in the helical structure of the liquid crystalline molecules; wherein the concentration of the chiral agent in the liquid crystal layer linearly varies in the direction of thickness of the liquid crystal layer.

In the first aspect of the present invention, it is preferable that the optical element further includes a substrate for supporting the liquid crystal layer, the substrate having an aligning surface facing the liquid crystal layer, the aligning surface having an aligning power for aligning the liquid crystalline molecules contained in the liquid crystal layer. Further, it is preferable that the liquid crystal layer has a first main surface facing the substrate and a second main surface opposite to the first main surface; and the helical pitch in a portion of the liquid crystal layer, placed on a side of the first main surface, is shorter than that in a portion of the same, placed on a side of the second main surface. On the other hand, it is also preferable that the helical pitch in a portion of the liquid crystal layer, placed on a side of the first main surface, is longer than that in a portion of the same, placed on a side of the second main surface. In addition, it is preferable that the liquid crystal layer further includes a photopolymerization initiator and that the liquid crystalline molecules contained in the liquid crystal layer are at least either one of polymerizable liquid crystalline monomer molecules and polymerizable liquid crystalline oligomer molecules.

A second aspect of the present invention is a method of producing a circular polarization controlling optical element, that includes the steps of: applying a cholesteric liquid crystal solution to a first substrate so as to form an uncured liquid crystal layer, the cholesteric liquid crystal solution having a photopolymerization initiator; and applying ultraviolet light to the uncured liquid crystal layer formed on the first substrate so as to cure the uncured liquid crystal layer, with an exposed surface of the uncured liquid crystal layer, placed opposite to a substrate-side surface facing the first substrate, being exposed to a gaseous atmosphere whose oxygen concentration at a normal pressure is 10% or more.

In the second aspect of the present invention, the gaseous atmosphere is preferably air. Further, in the step of applying the ultraviolet light, it is preferable to gradually decrease the oxygen concentration in the gaseous atmosphere after beginning application of the ultraviolet light. Furthermore, the intensity of ultraviolet light to be applied is preferably from about 10% to about 1% of that of ultraviolet light required to cure, in the gaseous atmosphere, the liquid crystalline molecules contained in the liquid crystal layer while keeping the helical pitch uniform. Further, in the step of applying ultraviolet light, it is preferable to heat the substrate. It is also preferable that the first substrate has an aligning surface facing the liquid crystal layer, the aligning surface having an aligning power for aligning the liquid crystalline molecules contained in the liquid crystal layer. In addition, it is preferable that the method further includes the step of bringing a second substrate made from an oxygen-permeable material into close contact with the exposed surface of the uncured liquid crystal layer, and that, in the step of applying the ultraviolet light, the ultraviolet light is applied to the uncured liquid crystal layer sandwiched between a pair of the substrates while supplying oxygen to the exposed surface of the uncured liquid crystal layer through the second substrate. In this case, it is preferable that the second substrate has an aligning surface facing the liquid crystal layer, the aligning surface having an aligning power for aligning the liquid crystalline molecules contained in the liquid crystal layer.

According to the circular polarization controlling optical element of the present invention, since the helical pitch in the helical structure of liquid crystalline molecules in a liquid crystal layer having a cholesteric order in planar alignment is controlled by linearly changing, in the direction of thickness of the liquid crystal layer, the concentration of a chiral agent in the liquid crystal layer, it is possible to attain the broadening of reflection wave range by a single liquid crystal layer without laminating a plurality of liquid crystal layers; and, moreover, deterioration of optical properties by interfacial reflection can be avoided because optical interfaces are present only in a decreased number. Further, it is not necessary to incorporate non-crosslinkable materials or the like that are usually used to provide a distribution of the concentration of liquid crystalline components, and it is possible to fully fix the structure of liquid crystalline molecules by ultraviolet light; and thus, the cured liquid crystal layer shows heat resistance and has optical properties that have been fixed and that will not change even when heated. In addition, in the step of curing the uncured liquid crystal layer, it is not necessary to heat the layer to high temperatures (150 to 300° C.) at which annealing is usually conducted, so that liquid crystalline materials can be selected from a wider range of materials.

Further, according to the method of the present invention, that produces such an optical element, it is possible to make the transition from a cholesteric phase in which the helical pitch is intrinsically uniform throughout a liquid crystal layer to such a cholesteric phase in which the helical pitch continuously varies in a liquid crystal layer, by curing an uncured liquid crystal layer so that the degree of curing on one surface of the cured liquid crystal layer will be different from that on the other surface of the same. It is therefore possible to simply and efficiently produce a circular polarization controlling optical element including a single liquid crystal layer having a broadened reflection wave range, and to well control the width of the reflection wave range of the liquid crystal layer.

Specifically, according to the method of the present invention, one surface of an uncured liquid crystal layer having a cholesteric order in planar alignment is brought into close contact with a substrate so that it will not come into contact with air, while the other surface of the uncured liquid crystal layer is exposed to a gaseous atmosphere whose oxygen concentration at a normal pressure is 10% or more, such as air; and under such conditions, ultraviolet light with a low intensity is applied to the uncured liquid crystal layer to cure the layer. In this case, on the gaseous-atmosphere-side surface of the liquid crystal layer, radical polymerization that is caused by the application of ultraviolet light is hindered due to oxygen in the gaseous atmosphere, so that the liquid crystalline molecules on this side are not easily cured but that those liquid crystalline molecules on the substrate-side surface of the uncured liquid crystal layer are well cured. For this reason, the rate of curing of the liquid crystalline molecules becomes uneven in the liquid crystal layer; and in coincidence with the thus provided distribution of the rate of curing, the concentrations of the liquid crystalline molecules (main component of the cholesteric liquid crystal) and the chiral agent make concentration gradients. In other words, since there is a difference in reactivity (i.e., tendency to get cured) between the liquid crystalline molecules (main component of the cholesteric liquid crystal) and the chiral agent, under the above-described distribution of the rate of curing, the concentrations of the liquid crystalline molecules (main component of the cholesteric liquid crystal) and the chiral agent, which have been uniform in the liquid crystal layer before the application of ultraviolet light, vary in the direction of thickness of the liquid crystal layer. Thus, a cured liquid crystal layer in which the helical pitch on the substrate-side first main surface is different from that on the air-atmosphere-side second main surface is finally obtained.

DETAILED DESCRIPTION OF PREFERRED EMBODIMENTS

By referring now to the accompanying drawings, preferred embodiments of the present invention will be described hereinafter.

Figure 1:
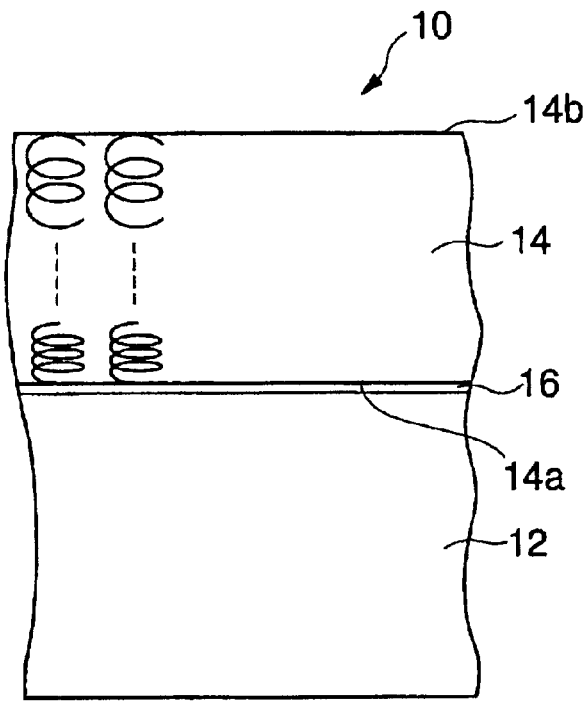
FIG. 1 is an enlarged cross-sectional view diagrammatically showing a circular polarization controlling optical element according to an embodiment of the present invention.

A circular polarization controlling optical element 10 according to an embodiment of the present invention includes, as shown in FIG. 1, a glass substrate 12, and a cholesteric liquid crystal layer 14 having a cholesteric order (cholesteric regularity) in planar alignment, supported by the glass substrate 12. on the cholesteric-liquid-crystal-layer-side surface of the glass substrate 12 is formed an alignment film 16 having an aligning power for aligning liquid crystalline molecules contained in the cholesteric liquid crystal layer 14.

The cholesteric liquid crystal layer 14 includes chiral nematic liquid crystal (cholesteric liquid crystal) composed of nematic liquid crystal (liquid crystalline molecules) and a chiral agent, and the helical pitch in the helical structure of the liquid crystalline molecules can be controlled by changing the concentration of the chiral agent. The cholesteric liquid crystal layer 14 can be formed in the following manner: after adding a photopolymerization initiator to a cholesteric liquid crystalline monomer solution (cholesteric liquid crystal solution) prepared by mixing the nematic liquid crystal and the chiral agent, the resulting mixture is applied to the alignment film 16 on the glass substrate 12, and cured by the application of ultraviolet light. Polymerizable liquid crystalline monomer or oligomer molecules can be used as the liquid crystalline molecules in the liquid crystal layer 14. Examples of polymerizable liquid crystalline monomer molecules useful herein include those mixtures of liquid crystalline monomers and chiral compounds that are described in Japanese Patent Laid-Open Publication No. 258638/1995 and Published Japanese Translation No. 508882/1998 of PCT International Publication. Examples of polymerizable liquid crystalline oligomer molecules useful herein include the cyclic organopolysiloxane compounds having cholesteric phases as described in Japanese Patent Laid-Open Publication No. 165480/1982.

In the cholesteric liquid crystal layer 14, the concentration of the chiral agent is linearly changed in the direction of thickness of the cholesteric liquid crystal layer 14. This makes the helical pitch in the helical structure of the liquid crystalline molecules continuously vary in the direction of thickness of the cholesteric liquid crystal layer 14.

In the cholesteric liquid crystal layer 14, the helical pitch on the first main surface 14a side (glass substrate 12 side) may be shorter (see FIG. 1) or longer than that on the second main surface 14b side, opposite to the first main surface 14a side. As described below, such a variation of helical pitch is determined by the difference in reactivity between the nematic liquid crystal (main component of the cholesteric liquid crystal) and the chiral agent. If the reactivity of the chiral agent is higher than that of the main component, the helical pitch on the glass substrate 12 side becomes shorter, and, in the reverse case, it becomes longer.

In general, the cholesteric liquid crystal layer 14 as described above has the property of selecting polarized light (the property of splitting polarized light), that is, the property of separating a component polarized in one direction from a component polarized in the opposite direction, according to the physical arrangement of the liquid crystalline molecules in the liquid crystal layer. In such a cholesteric liquid crystal layer 14, natural light (non-polarized light) that has entered along the helical axis of the planar arrangement of the liquid crystal (helical center axis) is split into two circularly polarized components, that is, right- and left-handed polarized components; and one of them is transmitted, and the other one is reflected. This phenomenon is known as circular dichroism. If the direction of optical rotation in the helical structure of the liquid crystalline molecules is properly selected, the component circularly polarized in the same direction as this is selectively reflected.

The scattering of rotated light that is reflected becomes maximum at the wavelength λ0 defined by the following equation (1):

$$\lambda 0 = nav \cdot p \tag{1}$$

wherein p is a helical pitch in the helical structure of liquid crystalline molecules (a length per pitch in the helix of liquid crystalline molecules), and nav is a mean refractive index on a plane perpendicular to the helical axis.

Further, the width Δλ of the wave range of the reflected light is represented by the following equation (2):

$$\Delta\lambda = \Delta n \cdot p \tag{2}$$

wherein Δn is an index of double refraction.

Namely, owing to the above-described property of splitting polarized light, when non-polarized light has entered into the cholesteric liquid crystal layer 14, either the right- or left-handed circularly polarized component of light whose wavelength is in the range (reflection wave range) centered at the wavelength λ0, having the width Δλ is reflected; and the other circularly polarized component of the light and light (non-polarized light) whose wavelength does not fall in the above range are transmitted. Upon reflection, the right- or left-handed circularly polarized component is reflected as it is without undergoing phase inversion unlike in the case of ordinary reflection.

In general, the half width of the reflection wave range of cholesteric liquid crystal in the visible light range is from 25 to 100 nm, so that the liquid crystal cannot broadly reflect light in the entire visible light range. In particular, in the shorter wave range of 400 to 500 nm, the half width is only 50 nm or less, and the reflection wave range is thus very narrow.

However, in the circular polarization controlling optical element 10 according to the embodiment of the present invention, the helical pitch in the helical structure of the liquid crystalline molecules in the cholesteric liquid crystal layer 14 continuously varies in the direction of thickness of the cholesteric liquid crystal layer 14, so that the optical element can have a remarkably broadened reflection wave range.

Figure 2:
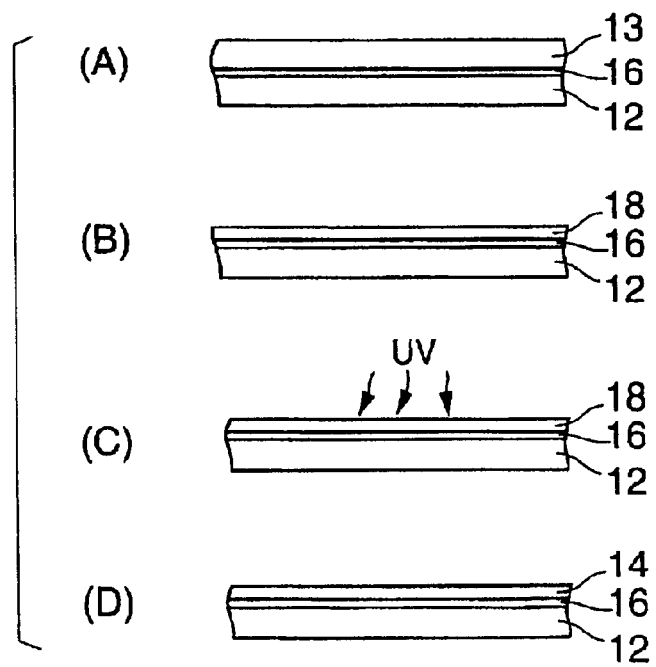
FIG. 2 is a diagrammatic cross-sectional view illustrating an embodiment of the method of producing the circular polarization controlling optical element shown in FIG. 1.

Next, a method of producing the circular polarization controlling optical element 10 as shown in FIG. 1 will be described by referring to FIG. 2.

As shown in FIG. 2(A), a glass substrate 12 on which an alignment film 16 having an aligning power for aligning liquid crystalline molecules is formed is firstly prepared. To this alignment film 16, a cholesteric liquid crystalline monomer solution (cholesteric liquid crystal solution) 13 prepared by mixing nematic liquid crystal and a chiral agent is applied by means of a spinner or the like. Note that a photopolymerization initiator is added beforehand to this cholesteric liquid crystal solution 13. Any of conventional photopolymerization initiators, for example, Irg 907, Irg 184, Irg 361 or Irg 651 (manufactured by Ciba Corp.) may be herein used.

Next, as shown in FIG. 2(B), the cholesteric liquid crystal solution 13 applied is heated by a hot plate or the like at a temperature between 50° C. and 90° C. to evaporate the solvent contained in the cholesteric liquid crystal solution 13, thereby forming a cholesteric liquid crystal layer 18 in the uncured state.

Thereafter, as shown in FIG. 2(C), ultraviolet light with a low intensity is applied to the uncured cholesteric liquid crystal layer 18 in the air (in an atmosphere of air). The photopolymerization initiator contained in the cholesteric liquid crystal solution and the ultraviolet light applied from the outside initiate polymerization. The liquid crystalline molecules in the uncured cholesteric liquid crystal layer 18 are three-dimensionally crosslinked (polymerized), and a cured cholesteric liquid crystal layer 14 as shown in FIG. 2(D) is finally obtained. In this step, the glass substrate 12 on which the uncured cholesteric liquid crystal layer 18 is formed may be heated, if necessary. By "three-dimensional cross-linkage" is herein meant that polymerizable monomer or oligomer molecules are three-dimensionally polymerized so that the resulting polymer can have a network structure. By this, it is possible to optically fix liquid crystalline molecules while retaining the arrangement of molecules characteristic of liquid crystal phase, and to obtain a film that is easy to handle as an optical film and stable at normal temperatures.

Since the non-glass-substrate-side surface of the uncured cholesteric liquid crystal layer 18 formed on the alignment film 16 on the glass substrate 12 is exposed to air, radical polymerization that is caused by the application of ultraviolet light is hindered due to oxygen contained in the air (oxygen concentration: approx. 20%). Therefore, the liquid crystalline molecules on the non-glass-substrate-side surface of the uncured cholesteric liquid crystal layer 18 are not so easily cured as those molecules that are on the glass-substrate-side surface of the same.

As mentioned previously, if the intensity of ultraviolet light applied is low, the liquid crystalline molecules in the uncured cholesteric liquid crystal layer 18 are not cured at the same rate; and thus, distribution of the rate of curing is provided in the uncured cholesteric liquid crystal layer 18. There is a difference in reactivity (i.e., tendency to get cured) between the nematic liquid crystal (main component of the cholesteric liquid crystal) and the chiral agent; and therefore, under the above-described distribution of the rate of curing, a distribution of the concentration of the liquid crystalline components (the nematic liquid crystal and the chiral agent) is provided between the area in which curing has proceeded and the area in which curing has not proceeded. This distribution of the concentration of the liquid crystalline components makes the helical pitch in the helical structure of the liquid crystalline molecules in the cured cholesteric liquid crystal layer 14 linearly vary in the direction of thickness of the liquid crystal layer. The cured cholesteric liquid crystal layer 14 can thus have a broadened reflection wave range.

In this case, the variation of helical pitch in the helical structure of the liquid crystalline molecules in the cholesteric liquid crystal layer 14 is determined, as mentioned previously, by the difference in reactivity between the nematic liquid crystal (main component of the cholesteric liquid crystal) and the chiral agent. For instance, in the case where the reactivity of the main component is lower than that of the chiral agent, the helical pitch on the glass substrate 12 side becomes shorter, and, in the reverse case, it becomes longer.

The intensity of ultraviolet light to be applied is preferably from about 10% to about 1%, more preferably from about 8% to about 2% of that of ultraviolet light required to cure, in the above-described atmosphere of air, the liquid crystalline molecules contained in the uncured cholesteric liquid crystal layer 18 while keeping the helical pitch uniform.

If ultraviolet light with a higher intensity is applied, radicals generate at a high rate in the uncured cholesteric liquid crystal layer 18, so that the difference between the degree of curing on the glass-substrate-side surface of the cholesteric liquid crystal layer 18 and that on the air-atmosphere-side surface of the same becomes small. As a result, the uncured cholesteric liquid crystal layer 18 is entirely cured before a distribution of the concentration of the liquid crystalline components (the nematic liquid crystal and the chiral agent) is provided, and a cholesteric liquid crystal layer having a conventional narrow reflection wave range is unfavorably formed. On the other hand, when the intensity of ultraviolet light applied is too low, the liquid crystalline molecules cannot fully be cured, or an excessively long time is needed to cure the liquid crystalline molecules.

When ultraviolet light with a low intensity is applied in an oxygen-existing atmosphere (an atmosphere that hinders radical polymerization), there is such a possibility that the outermost surface of the cholesteric liquid crystal layer (several nanometers from the surface) is not fully cured.

However, since the cholesteric liquid crystal layer according to the embodiment of the present invention does not contain non-crosslinkable materials that are usually used to provide a distribution of the concentration of liquid crystal components, it is possible to fully cure the layer, even if the layer comes into the above situation, by applying ultraviolet light with a proper intensity after a distribution of the concentration of the liquid crystal component is provided in the cholesteric liquid crystal layer. The helical structure characteristic of the cholesteric liquid crystal layer according to the embodiment of the invention has already been fixed in the aforementioned process of production, so that the optical properties of the cholesteric liquid crystal layer do not change even when ultraviolet light is additionally applied to the layer as described above.

In the circular polarization controlling optical element 10 according to the embodiment of the present invention, the helical pitch in the helical structure of the liquid crystalline molecules aligned in planar alignment in the cholesteric liquid crystal layer 14 are controlled by linearly changing the chiral agent concentration in the direction of thickness of the cholesteric liquid crystal layer 14. It is therefore possible to attain the broadening of reflection wave range by using a single liquid crystal layer without laminating a plurality of liquid crystal layers. Moreover, the deterioration of optical properties by interfacial reflection can also be avoided because the optical interfaces are present only in a decreased number. Further, in the embodiment of the invention, it is not necessary to use non-crosslinkable materials or the like that are usually used to provide a distribution of the concentration of liquid crystal components, and it is possible to fully fix the structure of the liquid crystalline molecules by the application of ultraviolet light. Therefore, the resulting cholesteric liquid crystal layer shows heat resistance, and has optical properties that have been fixed and that will not change even when heated. Moreover, in the step of curing the uncured cholesteric liquid crystal layer 18, it is not necessary to heat the layer to high temperatures (150 to 300° C.) at which annealing is usually conducted, so that it becomes possible to select liquid crystalline materials from a wider range of materials.

Furthermore, in the method of producing a circular polarization controlling optical element 10 according to the embodiment of the present invention, it is possible to make the transition from a cholesteric phase in which the helical pitch is intrinsically uniform throughout a liquid crystal layer to such a cholesteric phase in which the helical pitch continuously varies in a liquid crystal layer, by curing the uncured cholesteric liquid crystal layer 18 so that the degree of curing on one surface of the cured cholesteric liquid crystal layer will be different from that on the other surface of the same. It is therefore possible to simply and efficiently produce a circular polarization controlling optical element 10 including a single cholesteric liquid crystal layer 14, having a broadened reflection wave range, and to well control the width of the reflection wave range of the cholesteric liquid crystal layer 14.

In the above-described embodiments of the invention, the non-glass-substrate-side surface of the cholesteric liquid crystal layer 18 is exposed to air while ultraviolet light is being applied to the uncured cholesteric liquid crystal layer 18. However, the atmosphere in which ultraviolet light is applied is not limited to air, and any gaseous atmosphere can be used as long as its oxygen concentration at normal pressures is 10% or more.

Further, in the aforementioned embodiments, only one surface of the uncured cholesteric liquid crystal layer 18 is brought into contact with the glass substrate 12. However, the present invention is not limited to this, and any other constitution may be adopted as long as it can fulfill such a condition that oxygen does not exist on one surface of the uncured cholesteric liquid crystal layer 18 but that only the other surface of the layer is exposed to air (an atmosphere containing oxygen).

Figure 3:
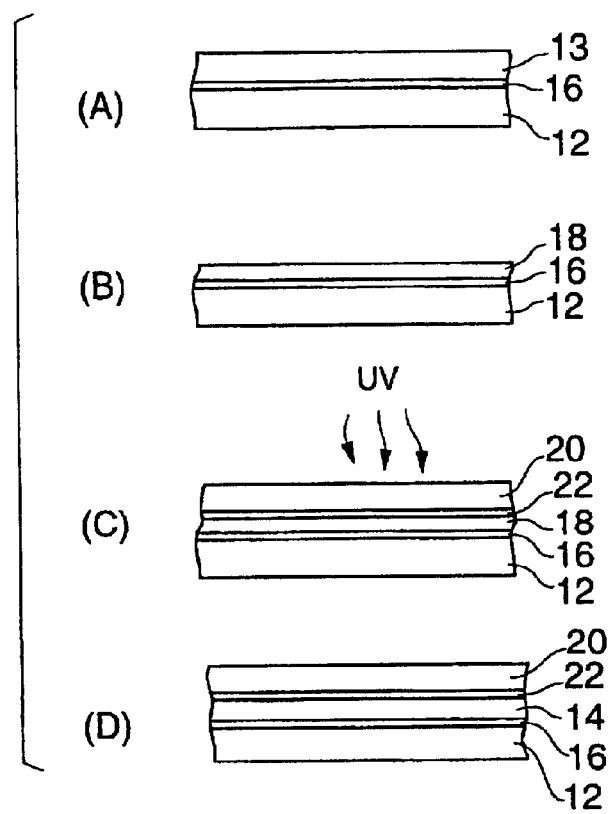
FIG. 3 is a diagrammatic cross-sectional view illustrating another embodiment of the method of producing the circular polarization controlling optical element shown in FIG. 1.

Accordingly, it is possible to adopt a production method as shown in FIGS. 3(A) to 3(D), for example. In this production method, a cholesteric liquid crystal solution 13 is firstly applied to an alignment layer 16 on a glass substrate (first substrate) 12 as shown in FIG. 3(A). The solvent contained in the cholesteric liquid crystal solution 13 is then evaporated by heat treatment carried out in order to form an uncured cholesteric liquid crystal layer 18 as shown in FIG. 3(B). As shown in FIG. 3(C), an additional substrate (second substrate) 20 made from an oxygen-permeable material is brought into close contact with the non-glass-substrate-side surface of the uncured cholesteric liquid crystal layer 18, and then, ultraviolet light is applied to the uncured cholesteric liquid crystal layer 18 sandwiched between the glass substrate 12 (the alignment film 16) and the additional substrate 20 (the alignment film 22). As a result, a cured cholesteric liquid crystal layer 14 is finally obtained as shown in FIG. 3(D). While applying ultraviolet light to the uncured cholesteric liquid crystal layer 18, it is preferable to supply oxygen to the non-glass-substrate-side surface of the uncured cholesteric liquid crystal layer 18 through the additional substrate 20.

In the case where oxygen is supplied to the uncured cholesteric liquid crystal layer 18 through the additional substrate 20, it is preferable to adjust the amount of oxygen to be supplied so that the partial pressure of oxygen on the cholesteric-liquid-crystal-layer-side surface of the additional substrate 20 will be nearly equal to the partial pressure of oxygen at the time when the oxygen concentration at normal pressures is 10% or more. If a sufficient amount of oxygen cannot permeate through the additional substrate 20, oxygen is supplied under pressure, or pure oxygen is used. Further, it is preferable to form, on the uncured-cholesteric-liquid-crystal-layer-side surface of the additional substrate 20, an additional alignment film 22 having an aligning power for aligning the liquid crystalline molecules contained in the uncured cholesteric liquid crystal layer 18. For the additional substrate 20 having oxygen-permeability, oxygen-permeable resins, etc., useful for contact lenses, oxygen-permeable membranes or the like may be used.

Furthermore, in the foregoing embodiments, the concentration or partial pressure of oxygen is kept constant while ultraviolet light is being applied to the uncured cholesteric liquid crystal layer 18. However, the present invention is not limited to this, and the step of applying ultraviolet light may be effected in such a manner that the concentration of oxygen is made high at the beginning of the application of ultraviolet light and gradually decreased thereafter. If ultraviolet light is applied in this manner, the rate of curing of the liquid crystal can be controlled by the rate of decrease of the oxygen concentration.

In the above-described embodiments of the present invention, a circular polarization controlling optical element 10 is made with a cholesteric liquid crystal layer 14, a single layer, only. However, the present invention is not limited to this, and a plurality of cholesteric liquid crystal layers 14 may be laminated to obtain a circular polarization controlling optical element having a desired reflection wave range (e.g., the entire visible light range).

EXAMPLES

The aforementioned embodiments are specifically explained by referring to the following Examples and Comparison Test.

Example 1

A 35% toluene solution of a cholesteric liquid crystalline monomer (cholesteric liquid crystal solution) was prepared by mixing nematic liquid crystal and a chiral agent. To this cholesteric liquid crystal solution, a photopolymerization initiator was added in an amount of 5% of the cholesteric liquid crystal. Irg 907 (manufactured by Ciba Corp.) was used as the photopolymerization initiator.

By using a spinner, the above-prepared cholesteric liquid crystal solution was applied to a glass substrate that had been provided with a polyimide film having an aligning power, and then dried at a temperature of 90° C. to remove the solvent (toluene) in the solution, whereby a 3-$\mu$m thick cholesteric liquid crystal layer in the uncured state was formed.

The cholesteric liquid crystal layer thus formed was cholesteric in a wide temperature range from normal temperatures to 100° C., had a reflection wave range centered at a wavelength of 535 nm, having a half width of 46 nm, and specularly reflected greenish right-handed polarized light.

This uncured cholesteric liquid crystal layer was placed in the air together with the glass substrate, and 2.6 mW/cm² of ultraviolet light (310 nm) was applied to the layer at a temperature of 90° C. for 60 seconds. Thus, a cured cholesteric liquid crystal layer having a broadened reflection wave range whose half width was approximately 150 nm was finally obtained.

Figure 4:
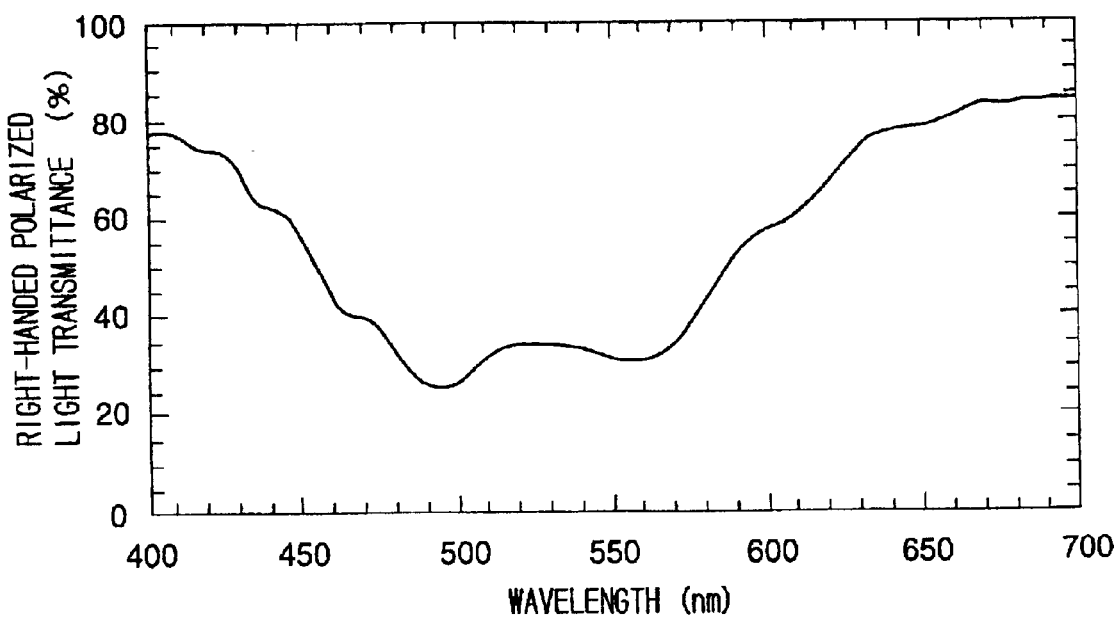
FIG. 4 is a graph showing the dependence, on wavelength, of the right-handed polarized light transmittance of the cholesteric liquid crystal layer (circular polarization controlling optical element) of Example 1.
Figure 5:
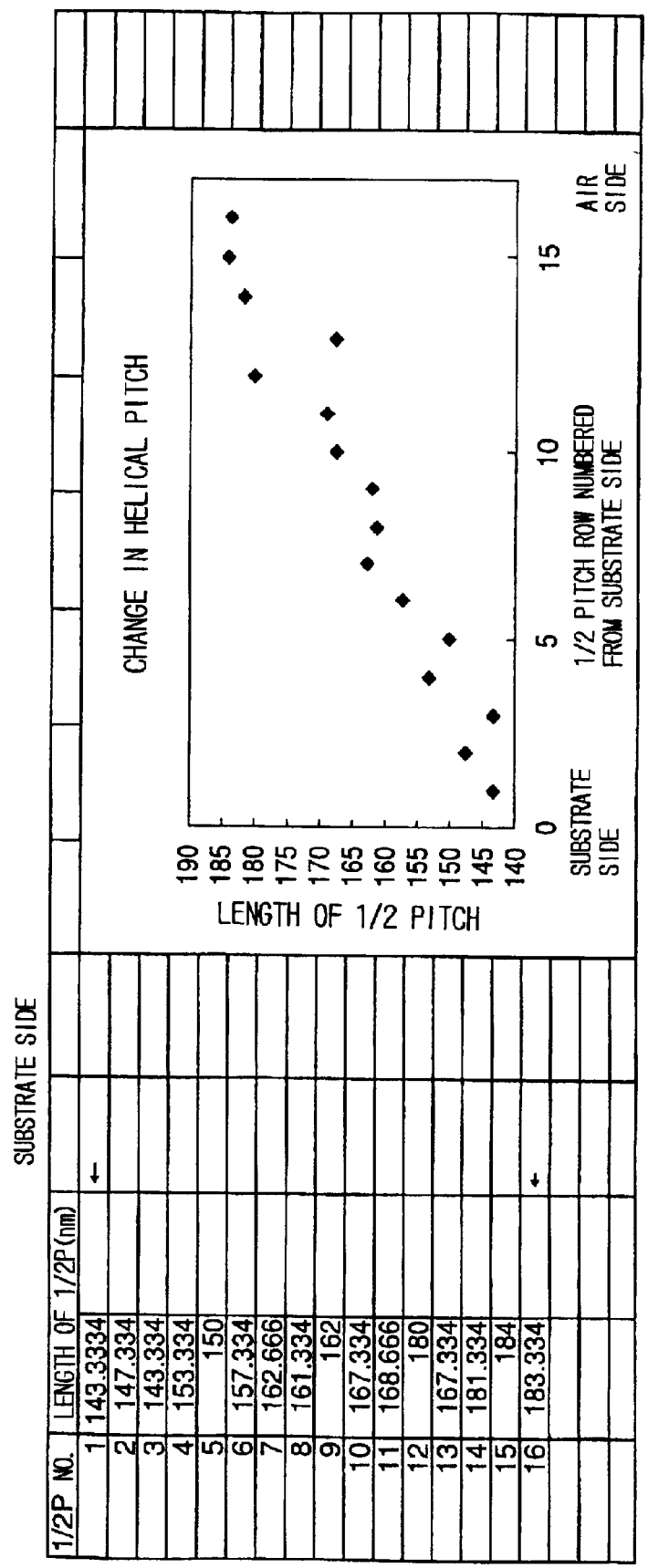
FIG. 5 is a graph showing the change in helical pitch in the helical structure of the cholesteric liquid crystal layer (circular polarization controlling optical element) of Example 1.

The dependence, on wavelength, of the right-handed circularly polarized light transmittance of the above cholesteric liquid crystal layer is shown in FIG. 4. Further, the change in helical pitch p in the helical structure of this cholesteric liquid crystal layer is shown in FIG. 5.

Example 2

In the same manner as in Example 1, an uncured cholesteric liquid crystal layer was formed on a glass substrate that had been provided with a polyimide film having an aligning power. 7.5 mW/cm² of ultraviolet light (310 nm) was then applied to this uncured cholesteric liquid crystal layer in the air at a temperature of 90° C. for 20 seconds. Thus, a cured cholesteric liquid crystal layer having a broadened reflection wave range whose half width was approximately 100 nm was finally obtained.

Figure 6:
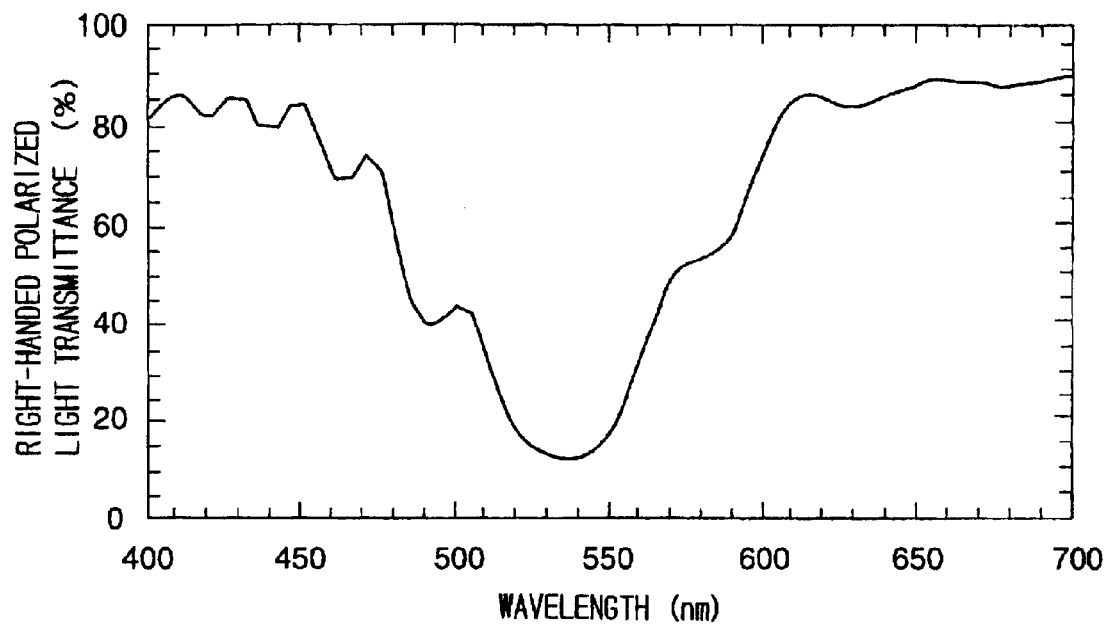
FIG. 6 is a graph showing the dependence, on wavelength, of the right-handed polarized light transmittance of the cholesteric liquid crystal layer (circular polarization controlling optical element) of Example 2.

The dependence, on wavelength, of the right-handed circularly polarized light transmittance of the above cholesteric liquid crystal layer is shown in FIG. 6.

(Comparison Test)

Uncured cholesteric liquid crystal layers formed in the same manner as in Example 1 were cured under various conditions (the atmosphere and the intensity of ultraviolet light applied), and the optical properties of the cured cholesteric liquid crystal layers were compared.

The relationship between the curing conditions (the atmosphere and the intensity of ultraviolet light applied) and the half width of the reflection wave range (reflection spectrum) is shown in Table 1. It is noted that FIGS. 7 to 10 are graphs showing the dependence, on wavelength, of the right-handed circularly polarized light transmittance of the cholesteric liquid crystal layers cured under the conditions shown in Table 1.

TABLE 1

| Atmosphere in Which Curing Is Conducted | Intensity of UV Applied (mW/cm²) | Half width of Reflection Spectrum (nm) |
|---|---|---|
| Nitrogen (oxygen concentration not more than 0.2%) | 220 | 43 |
| | 100 | 43 |
| | 50 | 43 |
| | 10 | 43 |
| | 1 | 43 |
| Air | 220 | 43 |
| | 150 | 43 |
| | 100 | 43 |
| | 90 | 43 |
| | 75 | 62 |
| | 50 | 62 |
| | 25 | (peak split) |
| | 7.5 | 100 |
| | 3.5 | 110 |
| | 2.5 | 150 |

Figure 7:
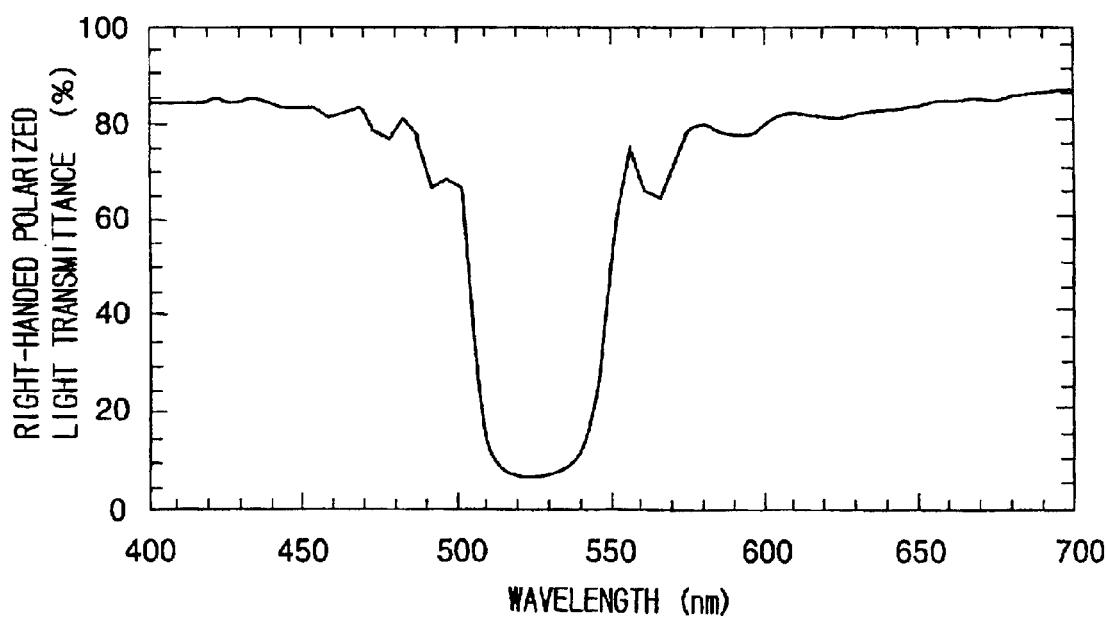
FIG. 7 is a graph showing the dependence, on wavelength, of the right-handed polarized light transmittance of the cholesteric liquid crystal layers (circular polarization controlling optical elements) made in Comparison Test, cured in an atmosphere of nitrogen.

In the case where curing is conducted in an atmosphere of nitrogen (oxygen concentration: approximately 0.2%), the half width of the reflection wave range and the spectrum of reflected light (circularly polarized light) remain unchanged as shown in Table 1 and FIG. 7 even if the intensity of ultraviolet light applied is changed. Thus, the broadening of reflection wave range cannot be attained in this case.

On the other hand, in the case where curing is conducted in the air (oxygen concentration: approximately 20%), the half width of the reflection wave range and the spectrum of reflected light (circularly polarized light) considerably vary according to the intensity of ultraviolet light applied as shown in Table 1.

Figure 8:
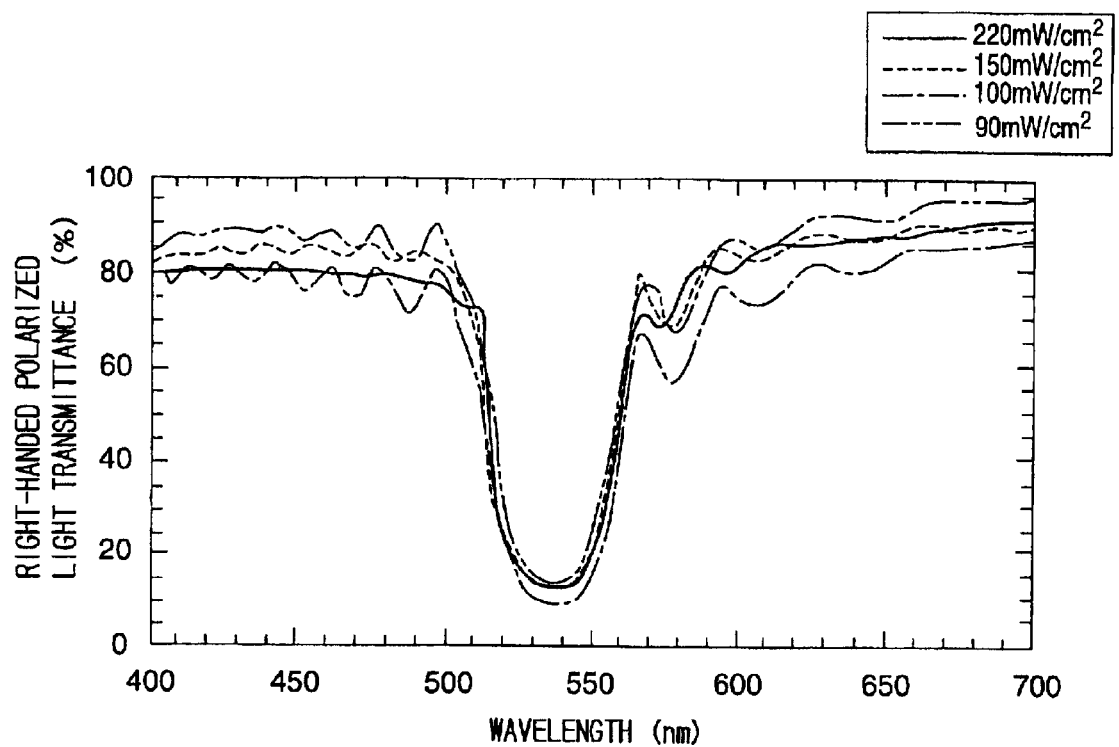
FIG. 8 is a graph showing the dependence, on wavelength, of the right-handed polarized light transmittance of the cholesteric liquid crystal layers (circular polarization controlling optical elements) made in Comparison Test, cured in the air by the application of 90 mw/cm$^2$ or more of ultraviolet light.
Figure 9:
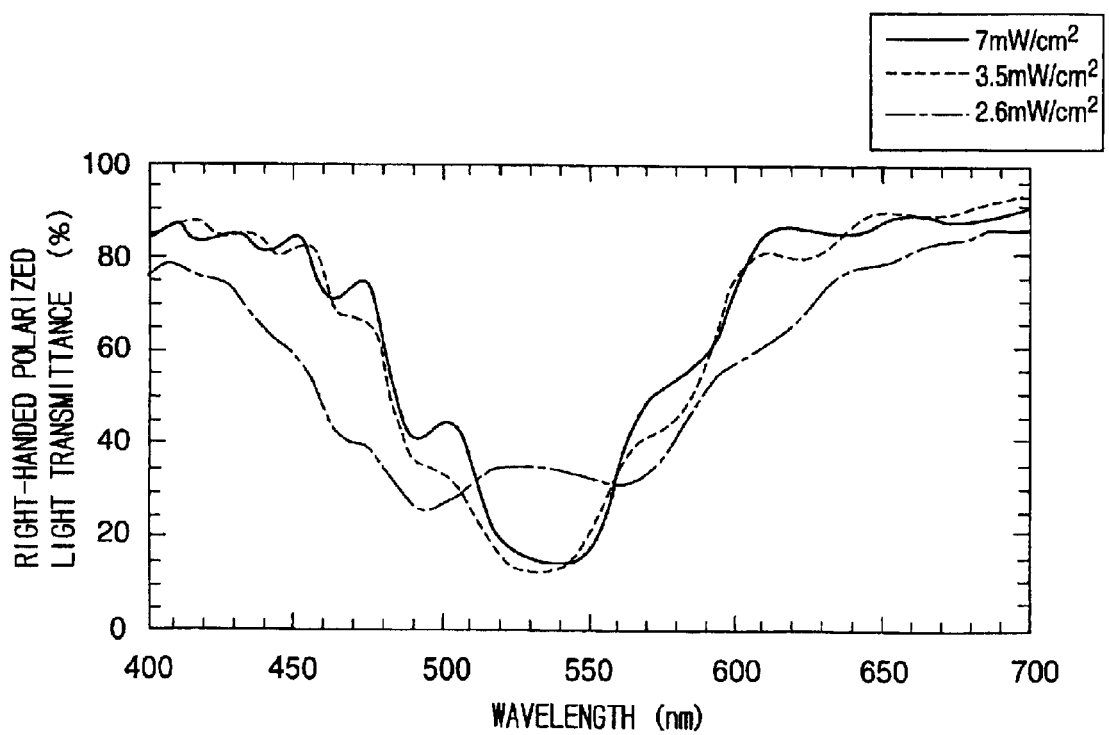
FIG. 9 is a graph showing the dependence, on wavelength, of the right-handed polarized light transmittance of the cholesteric liquid crystal layers (circular polarization controlling optical elements) made in Comparison Test, cured in the air by the application of 9 mW/cm$^2$ or less of ultraviolet light.
Figure 10:
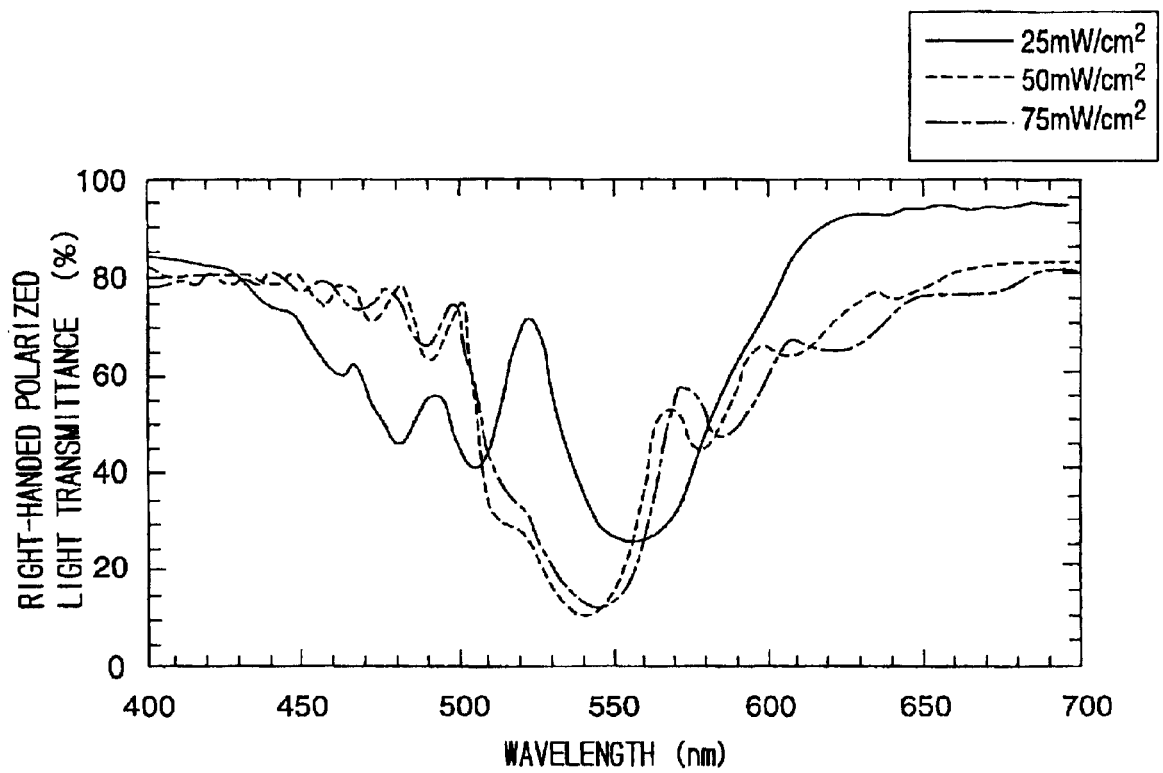
FIG. 10 is a graph showing the dependence, on wavelength, of the right-handed polarized light transmittance of the cholesteric liquid crystal layers (circular polarization controlling optical elements) made in Comparison Test, cured in the air by the application of 9–90 mW/cm$^2$ of ultraviolet light.

In this case, when 90 mW/cm² or more of ultraviolet light is applied, the half width of the reflection wave range remains equal to the conventional one as shown in Table 1 and FIG. 8, and the broadening of reflection wave range does not take place. on the contrary, when 7.5 mW/cm² or less, which is approximately 8% of 90 mW/cm², of ultraviolet light is applied, the half width of the reflection wave range is increased as shown in Table 1 and FIG. 9, and the broadening of reflection wave range can thus be attained. When ultraviolet light with an intensity of 25 mW/cm², 50 mW/cm² or 75 mW/cm², which falls in the range of less than 100% and 10% or more of 90 mW/cm², is applied, some changes can be found in the spectrum of reflected light (circularly polarized light), but the spectrum is split or insufficiently broadened as shown FIG. 10.

What is claimed is:

1. A method of producing a circular polarization controlling optical element, comprising the steps of:
    applying a cholesteric liquid crystal solution to a first substrate so as to form an uncured liquid crystal layer, the cholesteric liquid crystal solution having a photopolymerization initiator; and
    applying ultraviolet light to the uncured liquid crystal layer formed on the first substrate so as to cure the uncured liquid crystal layer, with an opposite-side surface of the uncured liquid crystal layer, placed opposite to a substrate-side surface facing the first substrate, being exposed to a gaseous atmosphere whose oxygen concentration at a normal pressure is 10 volume % or more, wherein, in the step of applying the ultraviolet light, the oxygen concentration in the gaseous atmosphere is gradually decreased after beginning application of the ultraviolet light.

2. The method according to claim 1, wherein, in the step of applying the ultraviolet light, the first substrate is heated.

3. The method according to claim 1, wherein the first substrate having an aligning surface facing the liquid crystal layer, the aligning surface having an aligning power for aligning the liquid crystalline molecules contained in the liquid crystal layer.

4. The method according to claim 1, wherein the gaseous atmosphere is air.

5. A method of producing a circular polarization controlling optical element, comprising the steps of:

applying a cholesteric liquid crystal solution to a first substrate so as to form an uncured liquid crystal layer, the cholesteric liquid crystal solution having a photopolymerization initiator; and applying ultraviolet light to the uncured liquid crystal layer formed on the first substrate so as to cure the uncured liquid crystal layer, with an opposite-side surface of the uncured liquid crystal layer, placed opposite to a substrate-side surface facing the first substrate, being exposed to a gaseous atmosphere whose oxygen concentration at a normal pressure is 10 volume % or more, wherein an intensity of the ultraviolet light to be applied is from about 10% to about 1% of that of ultraviolet light required to cure, in the gaseous atmosphere, the liquid crystalline molecules contained in the liquid crystal layer while keeping the helical pitch uniform.

6. The method according to claim 5, wherein, in the step of applying the ultraviolet light, the first substrate is heated.

7. The method according to claim 5, wherein the first substrate has an aligning surface facing the liquid crystal layer, the aligning surface having an aligning power for aligning the liquid crystalline molecules contained in the liquid crystal layer.

8. The method according to claim 5, wherein the gaseous atmosphere is air.

9. A method of producing a circular polarization controlling optical element, comprising the steps of:

applying a cholesteric liquid crystal solution to a first substrate so a to form an uncured liquid crystal layer, the cholesteric liquid crystal solution having a photopolymerization initiator;

applying ultraviolet light to the uncured liquid crystal layer formed on the first substrate so as to cure the uncured liquid crystal layer, with an opposite-side surface of the uncured liquid crystal layer, placed opposite to a substrate-side surface facing the first substrate, being exposed to a gaseous atmosphere whose oxygen concentration at a normal pressure is 10 volume % or more; and bringing a second substrate made from an oxygen-permeable material into close contact with the opposite-side surface of the uncured liquid crystal layer, wherein, in the step of applying the ultraviolet light, the ultraviolet light is applied to the uncured liquid crystal layer sandwiched between a pair of the substrates while supplying oxygen to the opposite-side surface of the uncured liquid crystal layer through the second substrate.

10. The method according to claim 9, wherein the second substrate has an aligning surface facing the liquid crystal layer, the aligning surface having an aligning power for aligning the liquid crystalline molecules contained in the liquid crystal layer.

11. The method according to claim 9, wherein the gaseous atmosphere is air.

* * * * *